United States Patent [19]
Lozinski et al.

[11] Patent Number: 5,623,695
[45] Date of Patent: Apr. 22, 1997

[54] SYSTEM FOR COMMUNICATING CONCURRENTLY WITH MULTIPLE SYSTEM FACILITATES THROUGH A SINGLE APPLICATION PROGRAMMING INTERFACE UTILIZING LOOK-UP TABLE SPECIFYING ENTRY POINT INFORMATION INTO AN IMPLEMENTATION

[75] Inventors: Zygmunt A. Lozinski, Winchester; Barry J. Worley, Southampton, both of England

[73] Assignee: International Business Machines Corporation, Armonk, N.Y.

[21] Appl. No.: 58,619

[22] Filed: May 6, 1993

[30] Foreign Application Priority Data

Jun. 12, 1992 [EP] European Pat. Off. .............. 92305403

[51] Int. Cl.⁶ .................................................. G06F 13/00
[52] U.S. Cl. ........................ 395/828; 395/830; 395/611
[58] Field of Search ............................. 370/84; 395/650, 395/500, 600, 155, 828, 830; 379/96

[56] References Cited

U.S. PATENT DOCUMENTS

| | | | |
|---|---|---|---|
| 4,943,996 | 7/1990 | Baker, Jr. et al. | 379/96 |
| 5,265,239 | 11/1993 | Ardolino | 395/500 |
| 5,276,679 | 1/1994 | McKay et al. | 370/84 |
| 5,335,346 | 8/1994 | Fabbio | 395/600 |
| 5,345,587 | 9/1994 | Fehskens et al. | 395/650 |

*Primary Examiner*—Thomas C. Lee
*Assistant Examiner*—Le Hien Luu
*Attorney, Agent, or Firm*—Mark S. Walker; Andrew J. Dillon

[57] ABSTRACT

To allow concurrent operation with more than one facility through the same standard programming interface, a data processing system is disclosed in which an application program can communicate with two or more system facilities via a programming interface common to the facilities, the system comprising a look-up table relating each of the facilities to corresponding entry point information for an implementation therefor of the programming interface, whereby an application program can select at any particular time which of the facilities to communicate with using the interface by extracting from the look-up table the entry point information corresponding to the implementation of the programming interface for the selected facility.

3 Claims, 1 Drawing Sheet

SYSTEM FOR COMMUNICATING CONCURRENTLY WITH MULTIPLE SYSTEM FACILITATES THROUGH A SINGLE APPLICATION PROGRAMMING INTERFACE UTILIZING LOOK-UP TABLE SPECIFYING ENTRY POINT INFORMATION INTO AN IMPLEMENTATION

FIELD OF THE INVENTION

The invention relates to data processing systems and, more particularly, to the co-existence therein of system facilities supporting a common programming interface.

BACKGROUND OF THE INVENTION

In data processing systems, programming interfaces are used to specify the way in which application programs communicate with system facilities—usually other programs running on the system, which typically control hardware facilities, such as communications adapters, storage devices and graphics cards, but can be software kernels providing, for example, database or document formatting facilities. These programming interfaces generally, but not exclusively, take the form of a library of subroutines which relate a common set of calls to tasks to be performed by the facility concerned.

Currently, programming interfaces that can be supported by the products of different manufacturers are being defined by standards bodies around the world. Each manufacturer uses an implementation of a standard programming interface tailored for their own products. An application program written to such a standard programming interface can then operate correctly with the products of different manufacturers. An example of this is the common ISDN Application Programming Interface defined by Deutsche Bundespost.

However, one problem with the use of such standard programming interfaces is that concurrent operation with more than one facility through the same programming interface cannot be achieved. This problem arises, for example, when more than one communication adapter using the ISDN API is installed in a data processing system. When the application calls the interface, the system does not know which implementation of the interface to use.

SUMMARY OF THE INVENTION

This invention provides a data processing system in which an application program can communicate with two or more system facilities via a programming interface common to the facilities, the system comprising a look-up table relating each of the facilities to corresponding entry point information for the implementation therefor of the programming interface, whereby an application program can select at any particular time which of the facilities to communicate with using the interface by extracting from the look-up table the entry point information corresponding to the implementation of the programming interface for the selected facility.

More than one facility supporting the same programming interface can thus coexist in the data processing system and the application program can select the required facility when calling the programming interface. Problems such as complex configuration for the end user are avoided because no knowledge of the presence of one manufacturer's product by another is required.

Preferably, the look-up table is a data-base which has a logical structure such that each record of the database includes three fields, a first field containing a generic name for the programming interface, a second field containing an identifier for the system facility and a third field containing the entry point information. This enables an application to obtain a list of the system facilities sharing the common programming interface by querying the database using the generic name. It will be understood that the words records and fields are used herein to refer to the logical structure of the database and not to any particular physical organisation of the data.

A further advantage of this scheme is that use can be made of resources which may already be provided by the operating system. For example, some operating systems, such as the IBM OS/2 operating system, provide a simple extendable database for storing application related information.

Accordingly therefore, the database can be provided by the operating system of the data processing system. This has the following advantages. No extensions are required to the operating system to support co-existence of facilities sharing the common programming interface. The technique therefore works on existing systems, such as the IBM OS/2 operating system. No software other than that provided by the product manufacturers is required, the cost of additional software being thereby avoided.

The invention also provides a method of installing an implementation of a programming interface for a system facility in a data processing system in which an application program can communicate with two or more such system facilities via the programming interface, the method comprising writing an entry in a look-up table relating the facility to corresponding entry point information for the implementation therefor of the programming interface.

BRIEF DESCRIPTION OF THE DRAWINGS

An embodiment of the invention will now be described, by way of example only, with reference to the accompanying drawing and the tables to be found at the end of the description, wherein.

Table I shows an excerpt from OS2.INI; and

Table II shows programming interface information in OS2.INI.

DETAILED DESCRIPTION

Figure 1:
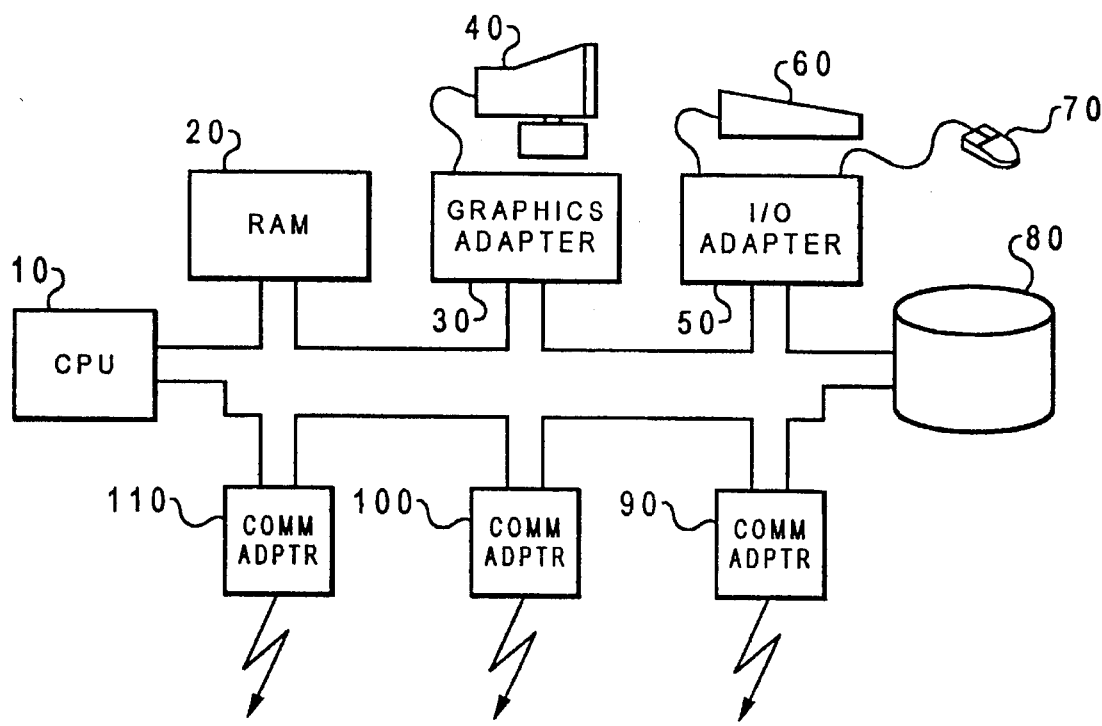
FIG. 1 is a schematic diagram showing the data processing system of the embodiment of the invention.

According to one embodiment, the invention comprises a general purpose personal computer, such as one of the range of IBM PS/2 personal computers, running the IBM OS/2 operating system. FIG. 1 is a schematic diagram showing such a general purpose computer. It comprises CPU 10, Random access memory 20, graphics adapter 30 connected to display device 40, I/O adapter 50 connected to user input devices keyboard 60 and mouse 70, disk storage device 80 and three communications adapters 90, 100, and 110. Communications adapters 90, 100, 110 connect the computer to various communications networks.

Figure 2:
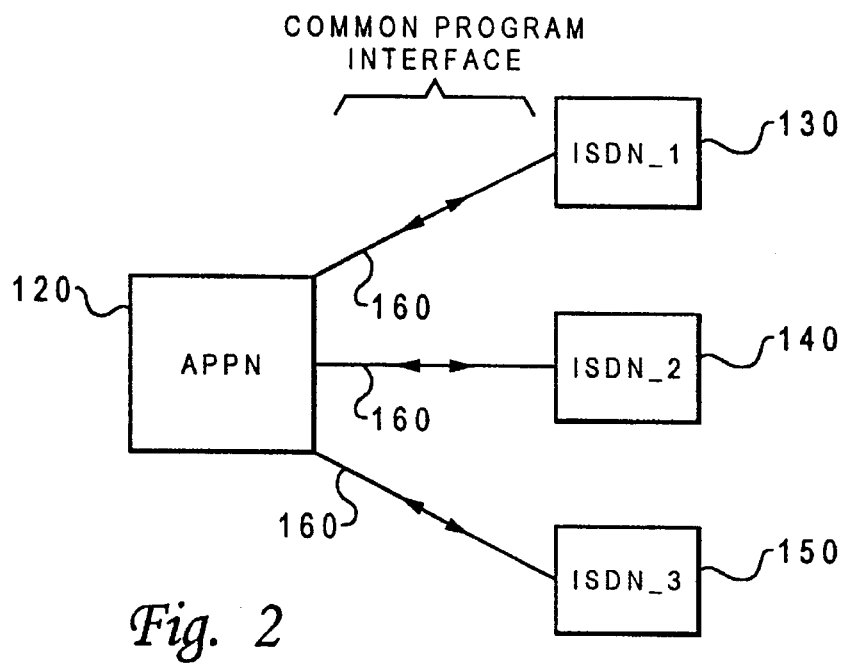
FIG. 2 is a schematic diagram illustrating the relationship between an application program and implementations of the common programming interface.

In this embodiment of the invention, application programs can communicate across the communications networks via communications adapters 90, 100, 110 using a programming interface to communicate with programs controlling the adapters. This relationship is illustrated in FIG. 2. Application program 120 communicates with programs 130, 140 and 150 which enable communications via the adapters 90, 100 and 110 respectively. Programs 130, 140 and 150 communicate with application program 120 using a common programming interface. This programming interface is represented in FIG. 2 by the arrows 160.

The OS/2 operating system provides a file, called OS2.INI, for storing application related information and end user preferences. The OS2.INI file is a simple database, stored on disk storage device 80, with two levels of key, an application name, and a key name. One example of its use is that the OS/2 Presentation Manager program stores the end user's preferred screen colours in OS2.INI using an application name of "PM Colours". This is shown in Table I. Another example of the use of the OS2.INI file is that the OS/2 LAN Manager program stores the server it logs onto in OS2.INI with an application name of LM_WORKSTATION.

Under OS/2, the usual mechanism for providing programming interfaces to application programs is using OS/2 Dynamic Link Libraries (DLL). Each implementation of a programming interface uses its own DLL. Thus, in this embodiment, each program 130, 140 and 150 has its own DLL containing its own implementation of the programming interface 160.

In this embodiment of the invention, the OS2.INI file is used as a look-up table so that applications can easily determine which programming interfaces are available and can obtain information enabling the application program to call the entry point address of the implementation of the programming interface.

At install time, enough information is placed in OS2.INI to allow applications that want to use the programming interface to find all the implementations available in the system. The programming interface information in OS2.INI is shown in Table II.

A generic application name for the programming interface is defined, for example "German Common ISDN API". A series of key names are defined to be used by providers of facilities using the common programming interface. In this embodiment key names corresponding to the manufacturers of adapters 90, 100, 110 are used.

When each implementation of the programming interface is installed, an entry is made in OS2.INI. A unique key name, which acts as an identifier for the implementation, is created within the defined application name in OS2.INI. A string is stored which can be used to invoke the programming interface within OS2.INI for the facility, keyed by application name and key name. This string consists of two blank delimited parts. The first substring is the module name of the programming interface's DLL, in a form suitable for use by DosLoadModule. The second substring, is the procedure name of the programming interface's entry point, in a format suitable for use by DosGetProcAddress. The interface that manages access to OS/2.INI serialises multiple concurrent accesses. Further information regarding the use of the DosLoadModule and DosGetProcAddress commands can be found in the IBM Operating System/2 Tools and Information Version 1.2 Control Program Programming Reference, September 1989, and the IBM Operating System/2 Tools and Information Version 1.2 Presentation Manager Programming Reference, Vol I, September 1989.

When an application wishes to determine which programming interfaces are available in the system, it queries OS2.INI using the defined application name. This query will return the list of key names, each of which corresponds to an available programming interface. The application may then retrieve the data associated with a selected implementation of the programming interface by querying OS2.INI using the application name and key name. The result of this query is the name of the programming interface's DLL and its entry point. To invoke one of the programming interfaces the application uses OS/2 to load the DLL and then calls the named entry point.

The selection of a desired implementation of the programming interface in this embodiment is made by the user of the application and is effected by the user being presented, in a manner well known in the art, with an on-screen menu listing all implementations of the programming interface available in the system. The selection is made by a mouse click with the system cursor located over the desired one of the implementations.

In this embodiment, the invention provides the ability for multiple implementation of the same programming interface to exist without modification under OS/2 and the ability for application program to determine which programming interfaces are available and to select one of them.

There is no interaction between the implementations of programming interfaces from different providers. This improves reliability and simplifies the task of the programming interface provider. There is no overhead in the programming interface itself required to support this method. The application can determine which programming interfaces are available, without running the programming interfaces themselves. This method is therefore more efficient than one which requires each programming interface to explicitly return information about themselves.

(IBM, OS/2, Operating System/2 and PS/2 used herein are trade marks of International Business Machines Corporation)

TABLE I

| Application Name | Key Name | Data |
|---|---|---|
| PM_Colors | Background | "204 204 204" |
| PM_Colors | Title Text | "255 255 255" |
| PM_WORKSTATION | LOGON_DOMAIN | "MY-SERVER" |

TABLE II

| Application Name | Key Name | Data |
|---|---|---|
| GERMAN_ISDN_API | IBM | "IBMISDN.DLL ISDN_MAIN" |
| GERMAN_ISDN_API | Hayes | "C:\HAYES\ISDN.DLL GermanAPI" |
| GERMAN_ISDN_API | SIEMENS | "C:\SIEMENS\ISDN.DLL GermanAPI" |

What is claimed is:

1. A data processing system for permitting an application program to communicate concurrently with a plurality of system facilities through a single application programming interface, said data processing system comprising:

said single application program interface having multiple implementations for permitting an application program to utilize specific data or functions within a plurality of system facilities to provide concurrent operation with said system facilities by controlling communication adapters;

a look-up table which specifies entry point information into a particular implementation of said application program interface for each of said plurality of system facilities, wherein said look-up table comprises a name of said single application program interface, identification of system facilities, and a unique key name corresponding to said entry point information; and means for selecting particular entry point information into said application program interface in response to selection of a particular system facility among said plurality of system facilities.

2. The data processing system according to claim 1, wherein said look-up table comprises a database.

3. A method for permitting an application program to communicate concurrently with a plurality of system facilities through a single application programming interface, said method comprising the data processing system implemented steps of:

providing a single application program interface having multiple implementations for permitting an application program to utilize specific data or functions within a plurality of system facilities to provide concurrent operation with said system facilities by controlling communication adapters;

creating a look-up table which specifies entry point information into a particular implementation of said application program interface for each of said plurality of system facilities, wherein said look-up table comprises a name of said single application program interface, identification of system facilities, and a unique key name corresponding to said entry point information; and selecting particular entry point information into said application program interface in response to selection of a particular system facility among said plurality of system facilities.

\* \* \* \* \*